United States Patent [19]
Specht et al.

[11] Patent Number: 5,509,776
[45] Date of Patent: Apr. 23, 1996

[54] APPARATUS FOR RAISING AND LOWERING A LOAD ON OR FROM A SUPPORT

[75] Inventors: Martin Specht, Feldafing; Udo Hausrath, Hadorf; Christoph Rösch, Starnberg, all of Germany

[73] Assignee: HS Technik Und Design Technische Entwicklungen GmbH, Oberpfaffenhofen, Germany

[21] Appl. No.: 275,873

[22] Filed: Jul. 15, 1994

[30] Foreign Application Priority Data

Jul. 22, 1993 [DE] Germany .......................... 43 24 669.9
Jul. 8, 1994 [EP] European Pat. Off. ............... 94110663

[51] Int. Cl.$^6$ .................................................. B60P 9/00
[52] U.S. Cl. ........................... 414/462; 224/319; 224/924
[58] Field of Search ...................... 414/462; 224/42.03 B, 224/310, 319, 924

[56] References Cited

U.S. PATENT DOCUMENTS

| | | |
|---|---|---|
| 4,400,129 | 8/1983 | Eisenberg et al. ............... 224/42.03 B |
| 4,524,893 | 6/1985 | Cole ........................................ 224/319 |
| 4,733,810 | 3/1988 | Graber et al. ........................... 414/462 |
| 5,284,282 | 2/1994 | Mottino .................................. 414/462 |
| 5,346,357 | 9/1994 | Hassell .................................... 414/462 |

FOREIGN PATENT DOCUMENTS

| | | | |
|---|---|---|---|
| 0587240 | 3/1994 | European Pat. Off. ............... | 224/310 |
| 2551705 | 3/1985 | France .................................... | 224/319 |
| 3513085 | 10/1986 | Germany . | |
| 8805981 | 8/1988 | Germany . | |
| 4122823A1 | 1/1993 | Germany . | |

*Primary Examiner*—David A. Bucci
*Assistant Examiner*—Douglas A. Hess
*Attorney, Agent, or Firm*—Keck, Mahin & Cate

[57] ABSTRACT

A device for lifting and/or lowering a load, in particular a two-wheeled vehicle such as a bicycle, onto or off of a load carrier connected to a motor vehicle, has an extension arm with which the load can be comfortably lifted and lowered.

7 Claims, 9 Drawing Sheets

# APPARATUS FOR RAISING AND LOWERING A LOAD ON OR FROM A SUPPORT

FIELD OF THE INVENTION

The invention pertains to a device for raising and/or lowering a load onto or from, respectively, a load carrier connected to a motor vehicle.

BACKGROUND OF THE INVENTION

Such a device for lifting and/or lowering a bicycle onto a rooftop carrier of a motor vehicle is known from DE 4,122,823 A1. With such a device, a bicycle can easily be lifted onto and taken down again, from the rooftop carrier in a standing position, that is, with wheels placed on the rooftop carrier.

The problem of the invention is to create a device of the type mentioned initially in which handling is improved.

SUMMARY OF THE INVENTION

The invention achieves an exact lowered position of the extension arm for an easier attachment of the load, as well as a simple attachment of the load to the load carrier. It is also possible to achieve an easier raising and lowering of the load with an energy accumulator.

Due to the fact that the energy accumulator and the transmission, which is constructed specifically as an articulated transmission, can be seated on the same support and that the direction of force with which the energy accumulator acts on the transmission can be changed, one acquires a structural unit that can be attached to a load carrier which can in turn be connected to a vehicle structure. This structural unit can be attached to any load carrier, in particular to rooftop carriers or carriers arranged in the vicinity of the rear trunk door of an automobile. The energy accumulator and the transmission, which transmits the drive motion of the energy accumulator, are buttressed on the same support, which can be connected to a load carrier that can be attached to an automobile or to a wall or ceiling of a basement, storage room, garage or the like.

In order to perform the various functions of the lifting device when raising the load, lowering the load or attaching the load, the force supplied by the energy accumulator, which may be a compressive or a tensile force, can be oriented in various directions. The transmission is preferably constructed such that it has a dead center position. On one side of the dead center position, the drive force coming from the energy accumulator can be absorbed by a stop provided on the shared support. This stop can achieve a rest position, which the transmission and the lifting device connected to it can assume. On the other side of the dead center position, the accumulated force can have a motive effect in the lifting direction on the transmission. In this way a required lifting force is exerted by the energy accumulator when lifting a load. Moreover, in the lowering process, the accumulated energy acting in the lifting direction can reduce the gravitational force of the load to be taken down.

When the transmission and the energy accumulator are on the other side of the dead center position, in which the rest position is defined, the accumulated force exerted onto the stop achieves a stabilizing effect for the components of the transmission and the lifting device in the rest position. In order to achieve force orientations on both sides of the dead center position, it is possible for the energy accumulator to pivot on the shared support about an articulation point. The energy accumulator can be a spring, e.g., a gas compressive spring, an electrical drive or the like.

The drive force of the energy accumulator can be transferred directly or via a coupler onto a rocker seated so as to be able to pivot on the shared support. The rocker transfers to the lifting device the drive force with which the load is to be lifted onto or taken down from the load carrier.

To this end, the extension arm of the lifting device can have a pivot arm that can be coupled to the rocker. Preferably, the rocker and the pivot arm are seated about a common pivot axis on the shared support.

Loads such as surf boards, boxes or two-wheeled vehicles such as bicycles or mopeds can be lifted onto or lowered from a load carrier provided in the hatchback door or trunk door of a vehicle, or a rooftop carrier.

In order to lift a two-wheeled vehicle such as a moped, a light motorcycle or a bicycle, it is possible to provide the pivot arm of the lifting device with a two-wheeled vehicle carrier that has at least one gripping element which can be brought into engagement with a cylindrical component of the two-wheeled vehicle. This gripping element has an open recess in a top piece, on one open side of which a rotary latch is pivotably seated so that the inner contours of the two recesses surround the cylindrical component of the bicycle in the closed position of the rotary latch.

On the top piece, it is also possible to arrange a sliding catch element that engages the rotary latch in the closed position.

The two-wheeled vehicle holder may also contain a telescoping holder bar that possesses gripping elements constructed in this way at both ends. The holder bar may have a spring tension in the expanding direction, which acts on the rotary latch of the respective gripping element in such a way that the latter is brought into the closed position while surrounding the cylindrical component of the two-wheeled vehicle. For this purpose, the rotary latch has an appropriately arranged rotational axis on the top piece of the gripping element and is constructed accordingly.

BRIEF DESCRIPTION OF THE FIGURES

The invention will be explained further on the basis of the figures, as follows.

DETAILED DESCRIPTION OF THE PREFERRED EMBODIMENTS

Figure 1:
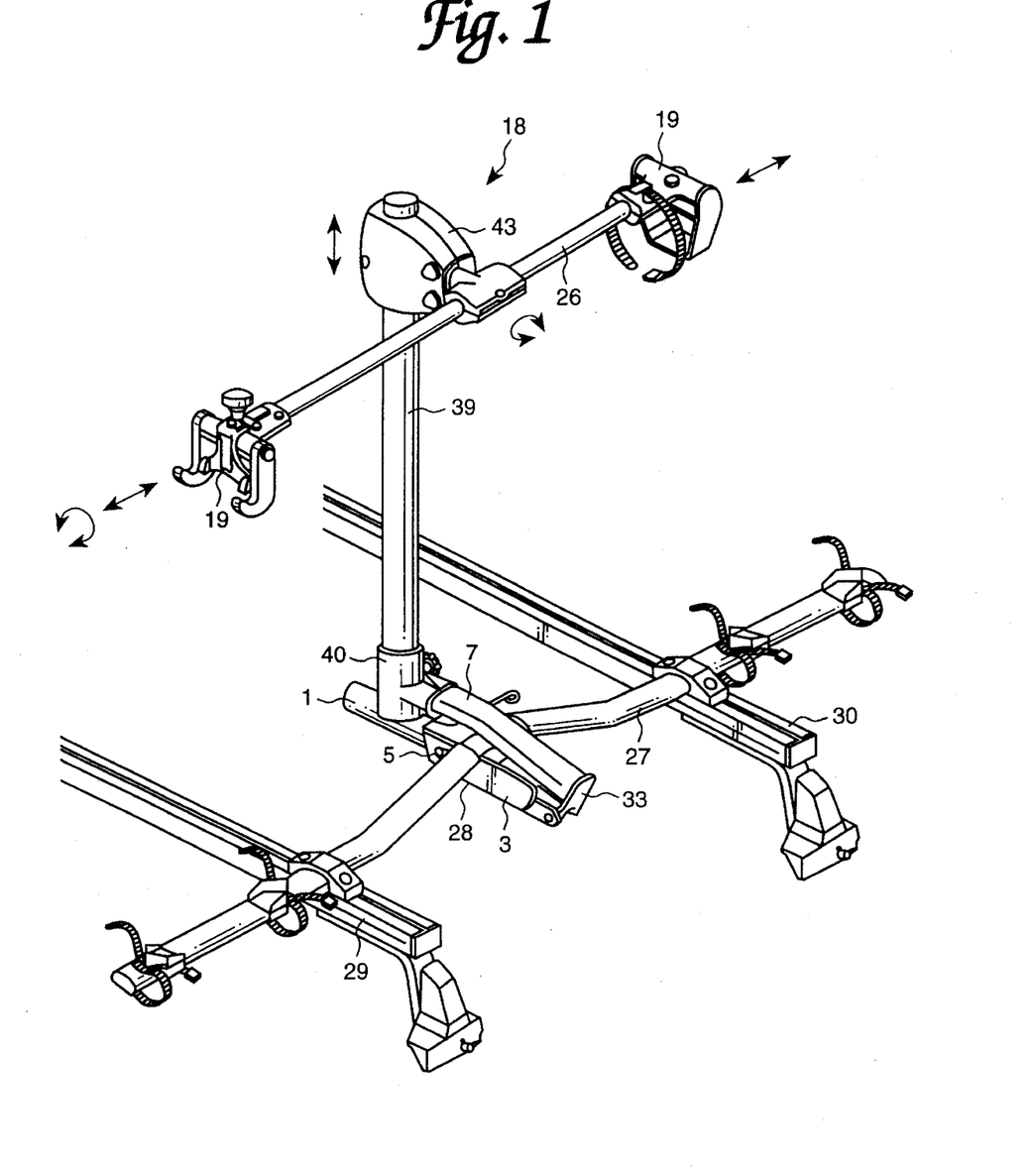
FIG. 1 is a perspective view of a lifting device of the invention for a lifting a two-wheeled vehicle, in particular a bicycle.

FIG. 1 is a perspective view showing a rooftop carrier of an automobile. Connected to a carrier bridge 27 of the rooftop carrier is a component 28 which has an energy accumulator 1 and a transmission 2, as shown in FIGS. 6–9, on a shared support 3 constructed as a frame plate.

Figure 6:
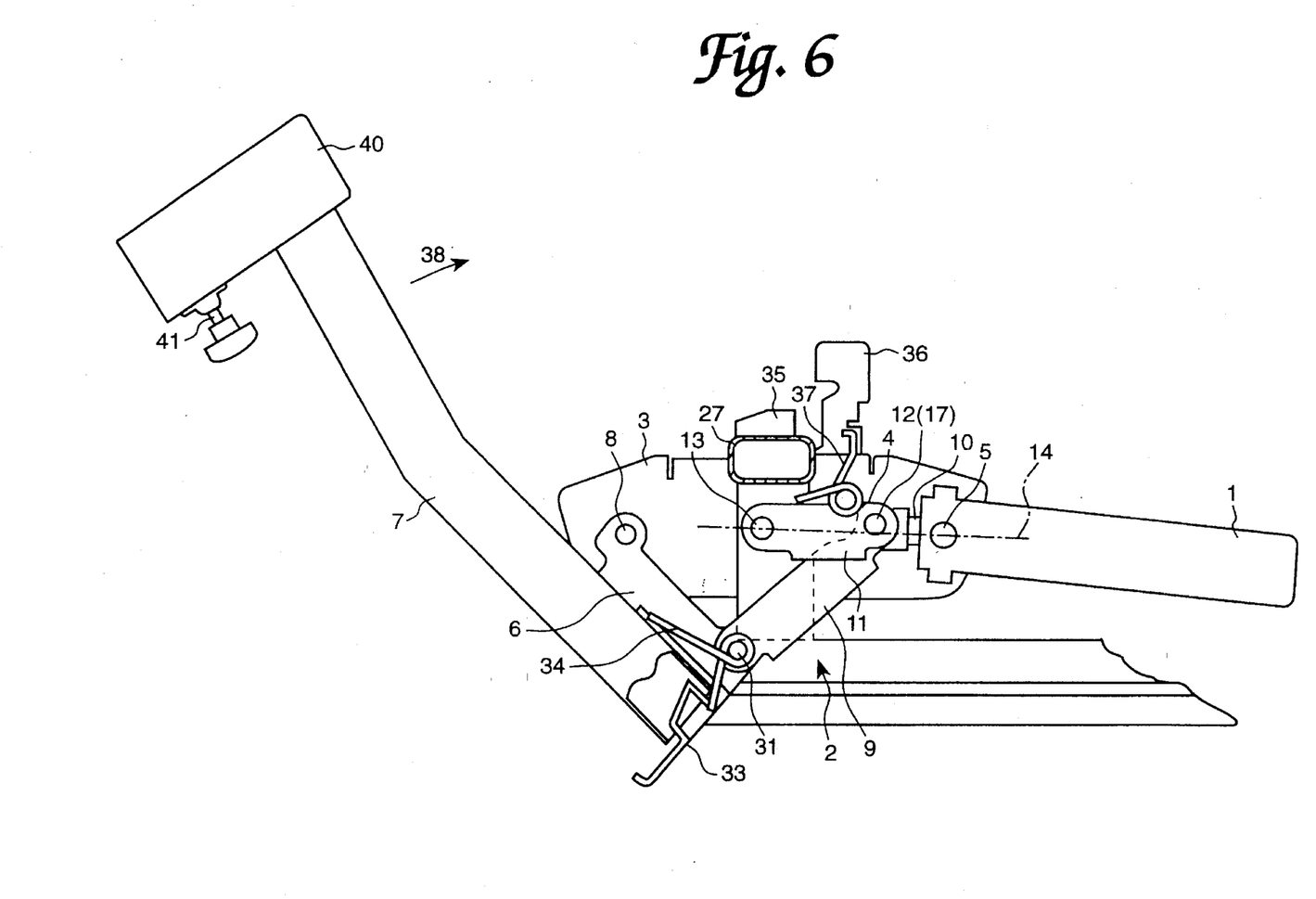
FIG. 6 a schematic elevational view of an example of an embodiment for a component unit containing an energy accumulator and a transmission which can be used in the embodiments illustrated in FIGS. 1–3, in a first operating position.
Figure 7:
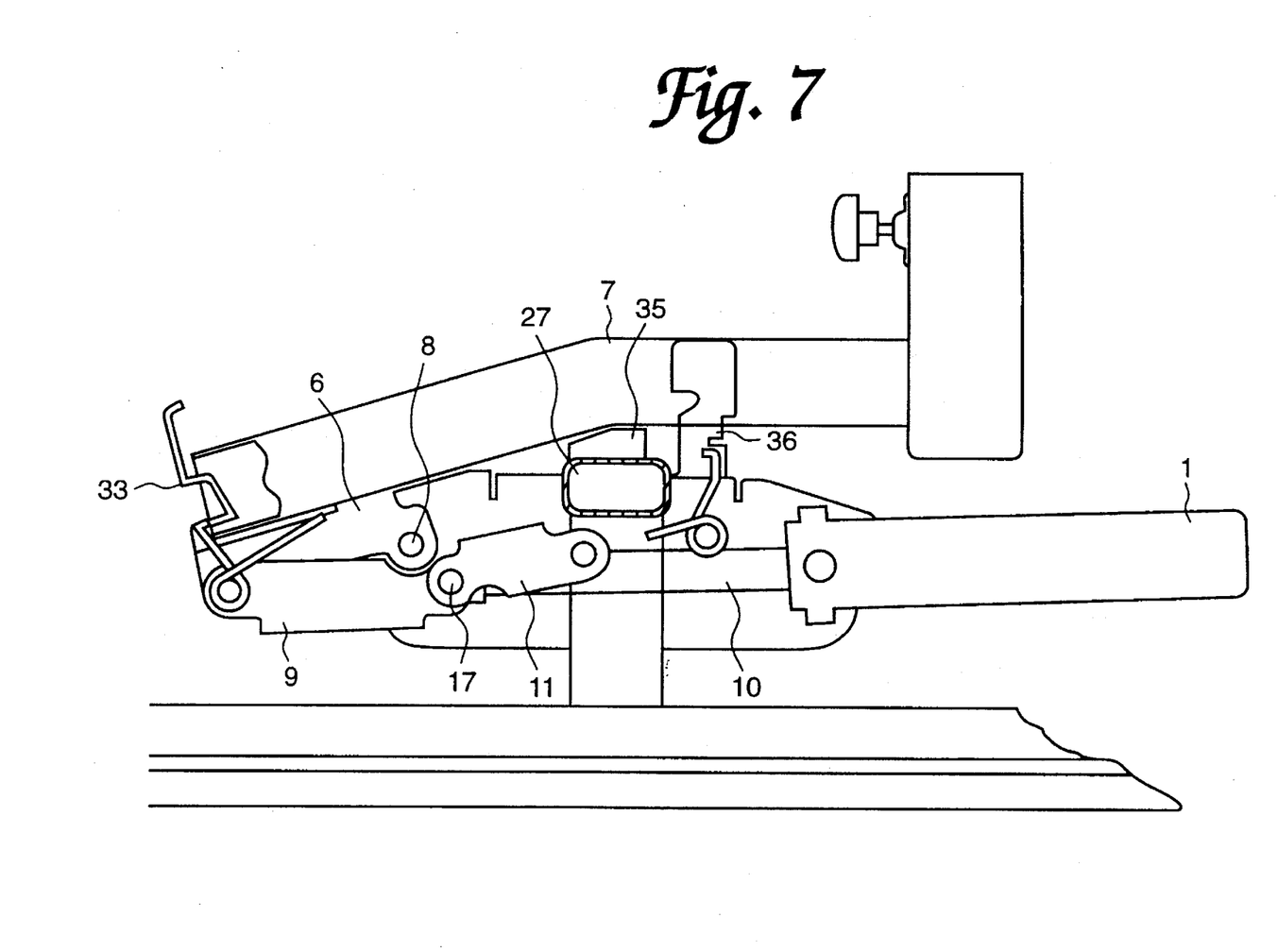
FIG. 7 is a schematic elevational view of the embodiment illustrated in FIG. 6 in a second operating position.
Figure 8:
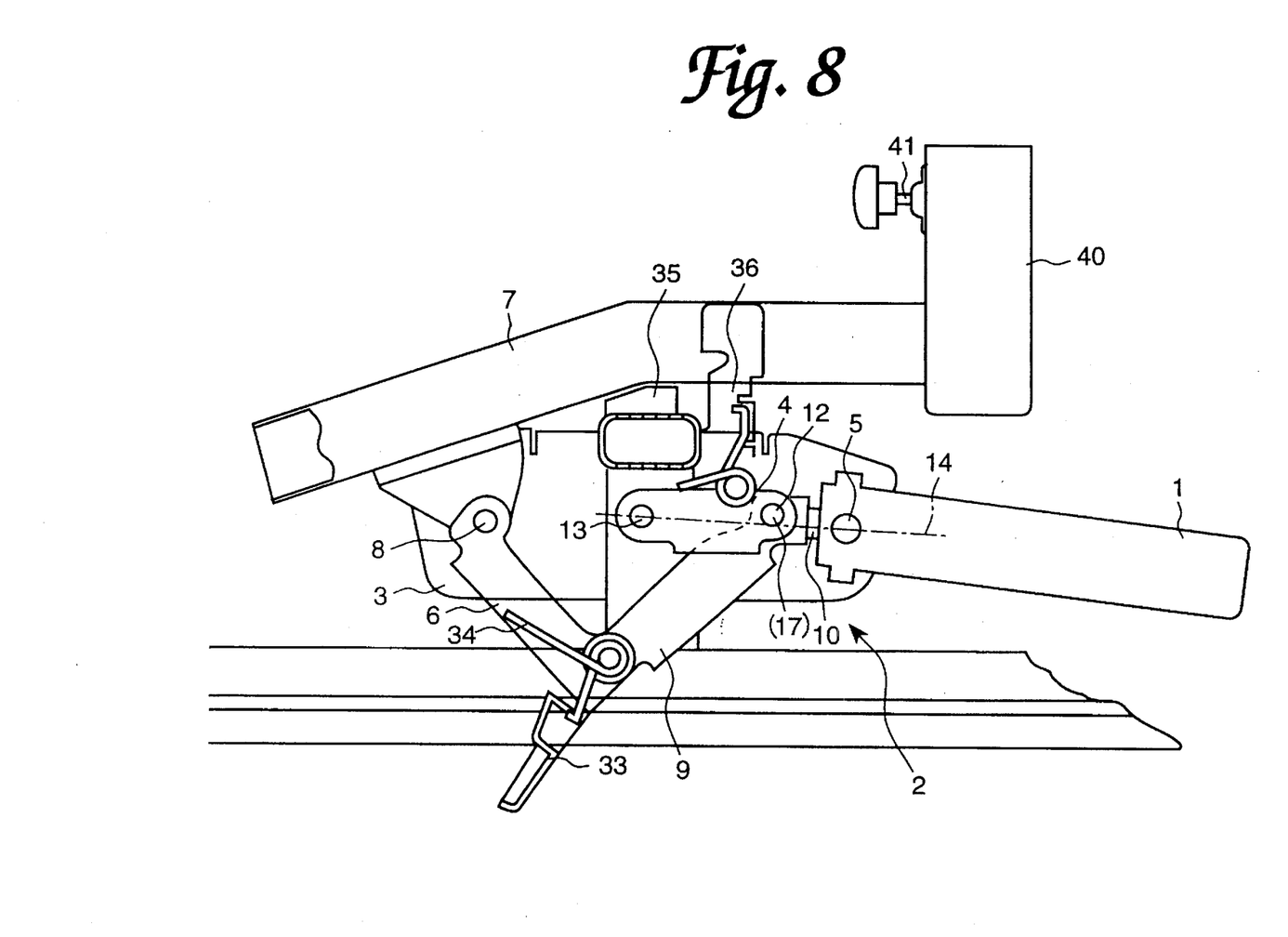
FIG. 8 is a schematic elevational view of the embodiment illustrated in FIGS. 6 and 7 in a third operating position.
Figure 9:
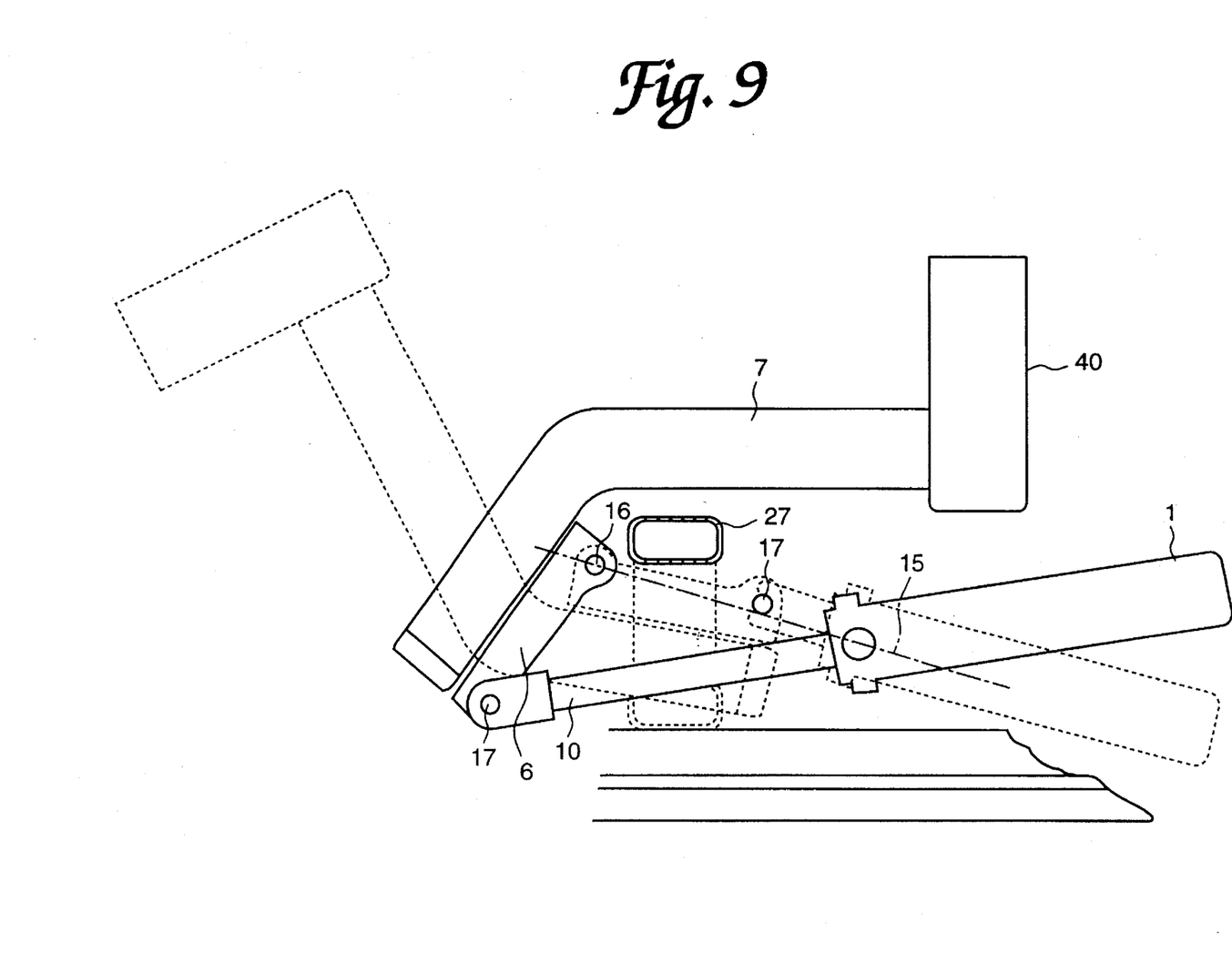
FIG. 9 is a schematic elevational view of an example of an additional embodiment for a component unit containing the energy accumulator and the transmission of the lifting device.

The carrier bridge 27 extends between two crossbars 29,30 of the rooftop carrier and is attached to the carrier. The component 28 is attached to the shared support 3 (frame plate) on the carrier bridge 27. A first embodiment example of the component is illustrated in FIGS. 6–8. A second embodiment example of the component is illustrated in FIG. 9. The same reference numerals are used in FIGS. 6–9 for parts with the same functions.

The energy accumulator 1 is attached so it can pivot at an articulation point 5 on the shared support 3. In the embodiment example of FIGS. 6–8, the transmission 2 consists of an articulated transmission. This articulated transmission has a first rocker 6, seated on the shared support 3 about a pivot axis 8. The pivot axis 8 is located at one end of rocker 6. There is an articulation point 31 at the other end of rocker 6, by means of which rocker 6 is connected to a coupler 9. The articulation point 31 is at one end of coupler 9. At its other end, coupler 9 is attached by means of an additional articulation point 12 to a drive means 10 of energy accumulator 1.

In the embodiment examples shown in FIGS. 6–9, the energy accumulator is constructed as a gas compression spring. The energy accumulator can also be formed by a mechanical compression spring. In place of a compression spring, it is also possible to employ a tensile spring, which is arranged in the opposite direction with reference to an attack point 17 coinciding in the illustrated embodiment example with articulation point 12, but having the same force orientation as the illustrated energy accumulator 1. A torsion spring, for instance, a torsion bar, is also suitable as an energy accumulator.

In the embodiment example, the drive means is constructed as a piston rod, which engages via an articulation pin that forms the joint 12, and thus forms the attack point 17 between coupler 9 and drive means 10.

A second rocker 11 is attached by its end to the articulation point 12 or the articulation pin. The other end of rocker 11 is seated at another articulation point 13 on the shared support 3. Whereas the first rocker 6 transfers the drive motion to a lifting device, as remains to be explained, and thus could also be termed a lifting rocker, the second rocker 11 has a guidance function for the attack point 17 at which the driving means 10 engages with the coupler 9. The attack point 17 is guided by rocker 11 on a circular path around articulation point 13.

In the embodiment example shown in FIGS. 6–8, the articulated transmission has four articulation points, specifically, articulation point 8 for first rocker 6, articulation point 31 between rocker 6 and coupler 9, third articulation point 12 between coupler 9 and second rocker 11, where the attack point 17 for drive means 10 is located at this articulation point, and fourth articulation point 13, in which second rocker 11 is seated on shared support 3.

The mode of operation of component 28 is described in further detail below on the basis of FIGS. 6–8.

A pivot arm 7 belonging to a lifting device is seated so as to be able to pivot at articulation point 8 on shared support 3. Pivot arm 7 thus has a shared pivot axis with first rocker 6. To transfer the drive motion, or the drive force, which is passed on from energy accumulator 1 via coupler 9, to pivot arm 7, a locking device 33, constructed as a locking lever pretensioned by a spring 34, is provided on rocker 6. The locking device 33, or the locking lever, can pivot around articulation point 31 and is pretensioned by spring 34 into the locking position. In FIG. 8, the pivot arm 7 is unlocked from rocker 6. The arm is in contact with a rubber stop 35 on the carrier bridge 27, and occupies the position shown in FIG. 1. In this position the pivot arm 7 is locked by an additional locking device 36 in the form of a pivoting locking lever seated on the shared support 3. Locking lever 36 is pretensioned into the locking position by a spring 37. In this position, for instance, a load can be held on the rooftop carrier. The illustrated embodiment example pertains to a bicycle held in the upright position by a two-wheeled vehicle carrier 18 on top of the rooftop carrier.

In order to stabilize the position of the transmission 2 in the operating position illustrated in FIG. 8, the energy accumulator 1 is in a rest position. In this rest position, the attack point 17 is between the drive means 10 and the coupler 9, above a connecting line 14 drawn in dashes between the attachment point 5 and the articulation point 13, which forms the dead center position of the transmission 2 and the drive device represented by the energy accumulator 1. The force orientation of the energy accumulator 1 lies on a connecting line between attachment point 5 and articulation point 17. In this position, the second rocker 11 makes contact with a stop 4 on the shared support 3. The stop 4 absorbs the drive force of energy accumulator 1, and this guarantees that the components of the transmission are held in a stable rest position. The load present on the load carrier, for instance, a bicycle or suitcase, surf board or the like, which are also still connected to the rooftop carrier, can then be transported by the motor vehicle. Because of the stabilizing effect exerted by the force passed on by energy accumulator 1 to the components of transmission 2 in contact with stop 4, the energy accumulator 1 and the transmission 2 remain in the illustrated rest position during the travel of the motor vehicle.

Pivoted lever 7, transmission 2 and energy accumulator 1 can assume the position illustrated in FIG. 8 when no load is present on the rooftop carrier or on the lifting device. In order to pick up a load from the ground and lift it, the crank 7 is pivoted around pivot axis 8 after loosening locking device 36 and coupled with the first rocker 6 via the locking device 33, so that the handle can perform a common revolution with rocker 6 about the shared pivot axis 8. A two-wheeled vehicle holder 18 can be connected to pivot arm 7, as seen from FIGS. 1–3. The pivot arm can also be connected to another load holder, for example a load holder for accommodating a luggage box, a surf board, a ski pack, or the like. When fastening the load to the holder 18, the attack point 17 continues to be located in the dead center position illustrated in FIG. 8, above the connection line 14. The entire arrangement is thus held in a stable position for taking up the load. To raise the load, the load holder 18 or the pivot arm 7 connected to it is pivoted a short way around pivot axis 8, with this pivot movement (arrow 38) being transferred in a clockwise direction onto rocker 6 and from there to attack point 17 via coupler 9. The attack point 17 is moved in this way to a point that lies below connecting line 14 (dead center position). In this position, the force of energy accumulator 1 acts in such a way that the drive means 10, that is, the piston rod, is pressed out of the casing of energy accumulator 1. This movement is transferred via the coupler 9 and the articulation point 31 onto rocker 6, thus onto the pivot arm 7 coupled to it, so that the latter is pushed further in the direction of arrow 38. In the process, the load connected via load holder 18 to pivot arm 7 is lifted. The load may be lifted by means of an extension arm 39 connected to pivot arm 7. The extension arm 39 is connected to pivot arm 7 by insertion into a tube sleeve 40 and clamping by means of a clamp screw 41. Pivot arm 7 is pivoted sufficiently until it reaches the position illustrated in FIG. 7. Pivot arm 7 is now in the position of FIG. 8, locked by locking device 36.

When lifting the load, or equivalently, when pivoting pivot arm 7 in the direction of the arrow 38, the drive force of energy accumulator 1 acts supportively via coupler 9 and rocker 6 in the rising direction, so that the load is brought into the desired position on the luggage carrier with no, or only very little manual effort.

To transport the load on the luggage carrier, the components of the transmission and the energy accumulator remain in the position shown in FIG. 7 during the transportation process. The coupler of the first rocker 6 and the pivot arm 7 is maintained here by the lock 33. This position is also shown in FIG. 1. Drive means 10 in the form of a push rod is extended out of the energy accumulator 1. Due to the force transmitted in that way from energy accumulator 1, which is exerted at the attack point 17 onto the transmission parts, and due to the holding force of the locking device 36 on pivot arm 7, a stable positioning is insured during the transportation of the load.

To take the load back down from the luggage carrier, the weight force exerted by the load to be lowered is moderated by the drive force of energy accumulator 1, which acts opposite the lowering direction (opposite the arrow 38 in FIG. 6) on pivot arm 7 via drive means 10, coupler 9 and rocker 6. This makes taking the load down from the load carrier or the rooftop carrier easier. During the lowering, the components of transmission 2 and the energy accumulator 1 once again move into the final position illustrated in FIG. 6, where the load can be taken off load carrier 18. When the lifting device or the load carrier is to remain on the vehicle without a load, the locking device 33 between rocker 6 and pivot arm 7 is loosened so that pivot arm 7 can be brought into its rest position locked by locking device 36 (FIG. 8). As already explained above, because of the position of the attack point 17 above the dead center line 14, the energy accumulator 1 and the components of the transmission 2 also remain in the rest position illustrated in FIG. 8. Due to the guiding function of the second rocker 11, exerted onto the attack point 17, the various components of transmission 2 and energy accumulator 1 are always guided in a defined way. Attack point 17 is guided by second rocker 11 on a circular path around articulation point 13 on the shared support 3.

While four articulation points formed by hinge bolts are provided in the embodiment example illustrated in FIGS. 6–8, the embodiment example shown in FIG. 9 has three articulation points. Instead of two rockers, one rocker 6 is provided, which can be pivoted about an articulation point 16 on the shared support 3. In FIG. 9 the position the components assume in the raised rest position is shown in solid lines, and dashed lines show the position the components assume in the lowered position. It can be seen from this that in the rest position of the lowered lifting device the attack point 17 lies below a connection line 15 between coupling site 16 and coupling site 5, the line forming the dead center position. The device can be kept in this position with a decoupled pivot arm 7 (the equivalent of FIG. 8).

An additional difference with respect to the embodiment example of FIGS. 6–8 also consists of the fact that the drive means 10 engages directly at the rocker 6 in attack point 17. The coupler 9 can therefore be eliminated.

Figure 2:
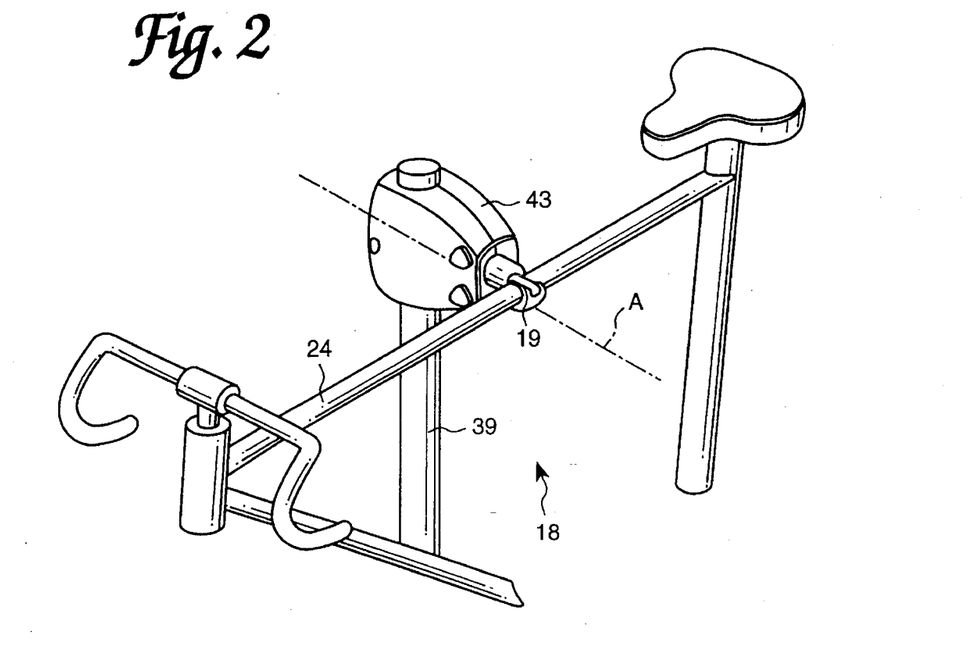
FIG. 2 is a detail of one embodiment of the lifting device for the bicycle.
Figure 3:
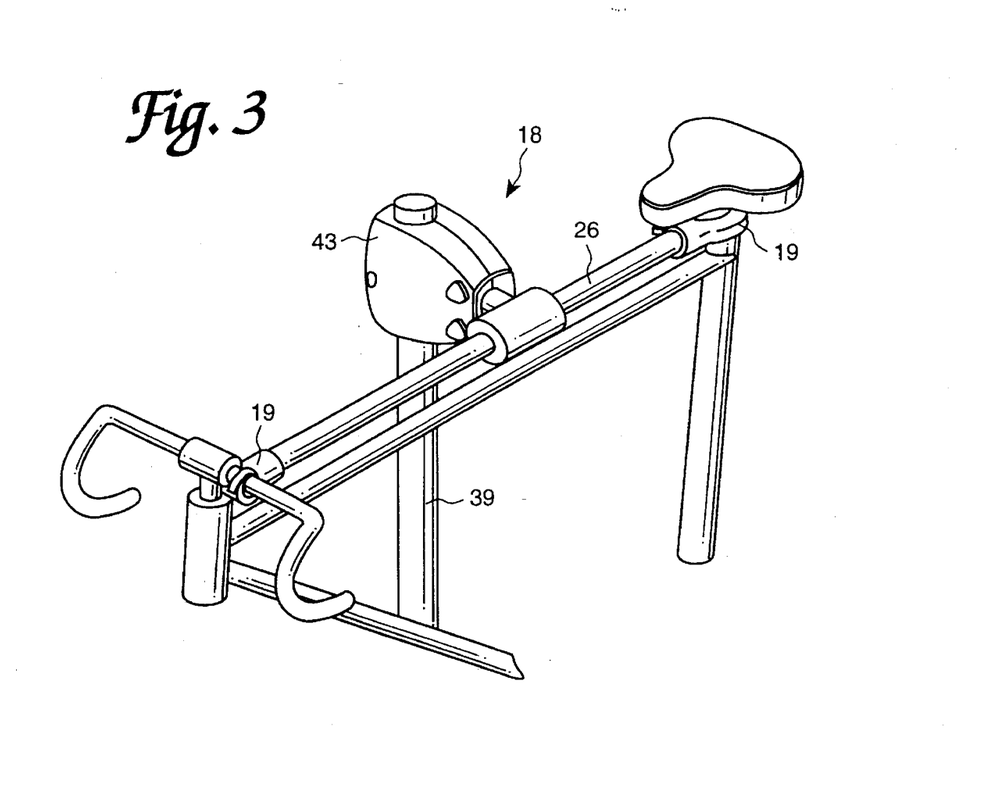
FIG. 3 is a detail of another embodiment of the lifting device for the bicycle.

A holder 18 for a load, which in the illustrated example is a two-wheeled vehicle holder, is shown in FIGS. 1–3. As can be seen specifically from FIG. 2, this two-wheeled vehicle holder has at least one gripping element 19, which can be made to engage with a cylindrical component 24 of a two-wheeled vehicle, particularly a bicycle. The gripping element 19 is shown in detail in FIGS. 4 and 5. The gripping element has a top piece 21 with an open recess 20. The recess 20 has an arch-shaped inner contour, which preferably departs from circular form. On one side of the recess opening there is a rotary latch 22 on top piece 21. The rotary latch 22 likewise has an opened recess 23. The rotary latch 22 can be pivoted in the recess 20 provided in the top piece 21 into a closed position (FIG. 5). In the closed position, the inner contours of the two recesses 20 and 23 surround the cylindrical component 24. Due to a catch element 25 that can be displaced under spring tension in the direction of catch teeth 42 on the rotary latch 22, the rotary latch 22 can be held in the closed position. In this position, the catch element 25 engages with one of the catch teeth 42.

As can be seen from FIG. 2, a gripping element 19 can be attached with a fastening piece 43 to the extension arm 39 of the load carrier 18. The gripping element 19 can be capable of rotating about an axis A. The latter runs essentially perpendicular to the cylindrical component 24, which is held by gripping element 19. Due to the adjustable height of the fastening piece 43 and the ability of the gripping element 19 to pivot, it is possible to perform a precise positioning of the raised load, the two-wheeled vehicle for instance, on the rooftop carrier shown by way of example in the upright position in FIG. 1.

The load holder 18 can additionally have a telescoping holder rod 26 that has gripping elements 19 on both ends. The gripping elements 19 can be made to engage with different components of the two-wheeled vehicles, with the handlebar post and the seat post of a bicycle (FIG. 1) or with the handlebar and the seat post of a bicycle (FIG. 3). Because of the ability of the holder rod 26 to telescope and the pivoting housing of the respective gripping element 19 on the holder rod, one achieves an optimal adjustment to the dimensions of the load to be secured.

Figure 4:
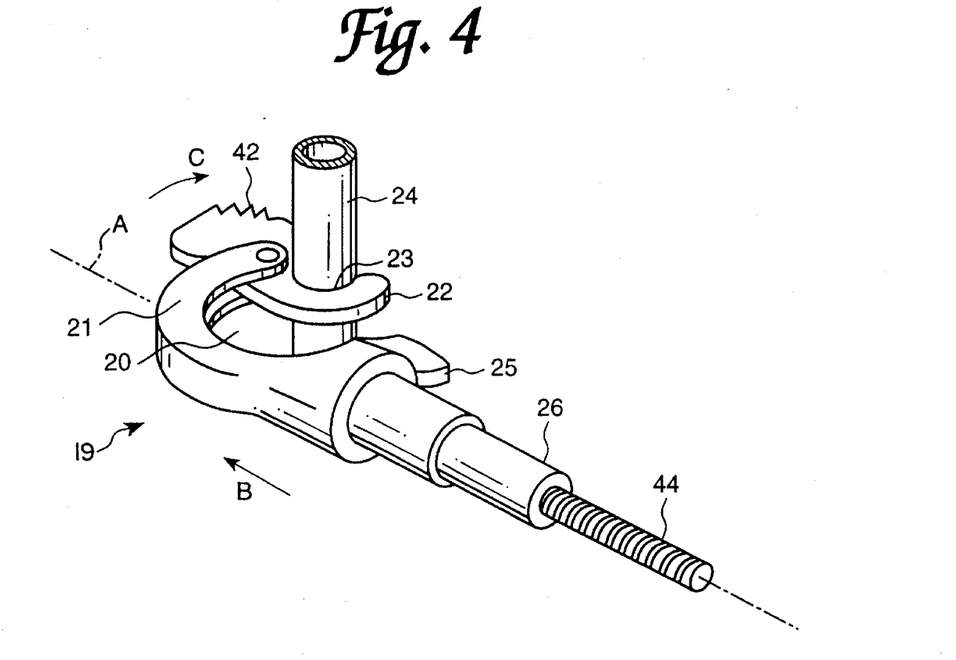
FIG. 4 is a perspective view of a gripping element which can be applied in the embodiments of the invention illustrated in FIGS. 1–3 in the opened position.
Figure 5:
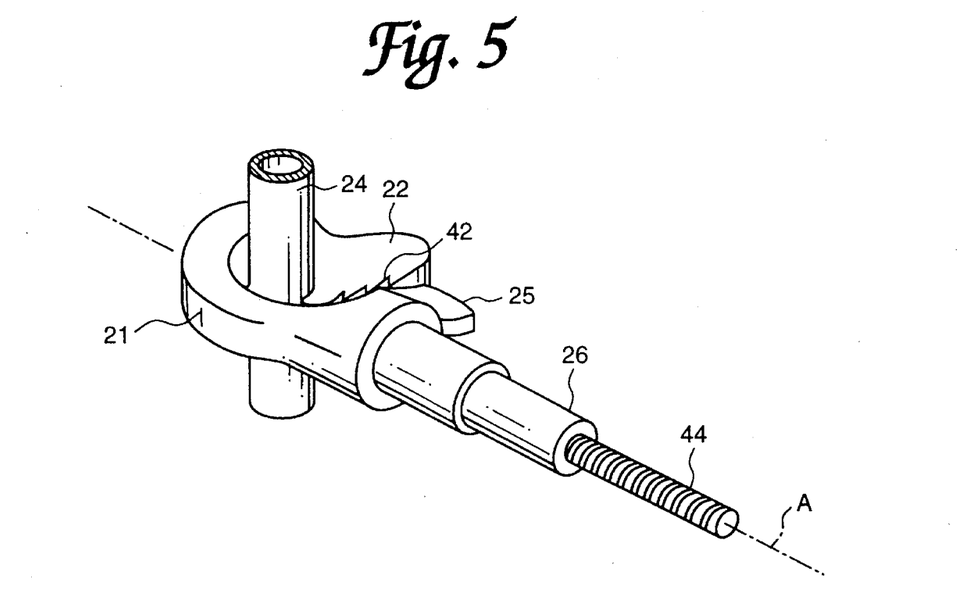
FIG. 5 is a perspective view of the gripping element illustrated in FIG. 4, in closed position.

The holder rod 26 can have a spring tension in its axial direction (spring 44 in FIGS. 4 and 5), acting in the extension direction (arrow B in FIG. 4). This spring tension supports the pivoting (arrow c in FIG. 4) of rotary latch 22 into its closed position. The two recesses 20 and 23 are formed in such a way that the top piece 21 and the rotary latch 22 form seating forks for the cylindrical component 24. In the closed position, the two fork components work together by surrounding the cylindrical component 24 to be gripped (FIG. 5). As FIG. 4 shows, the fork shape of the rotary latch 22, in which the cylindrical component 24 is embedded, cooperates with the tension of the spring 44 in such a way that the pivoting into the closed position happens practically automatically (FIG. 5). In this closed position, one has a stable positioning of the load to be held firmly, which is further supported by the catch element 25, which engages in catch teeth 42 of the rotary latch 22.

If the fastener 43 is configured appropriately, more than one holder rod 26 can be attached to it, so that two or even three bicycles can be simultaneously lifted and lowered.

The tubular casing 40 into which the extension arm 39 is inserted, can also pivot about another horizontal axis, so that the extension arm 39 and the fastening rod can be arranged to lie flat on the rooftop carrier.

Figure 10:
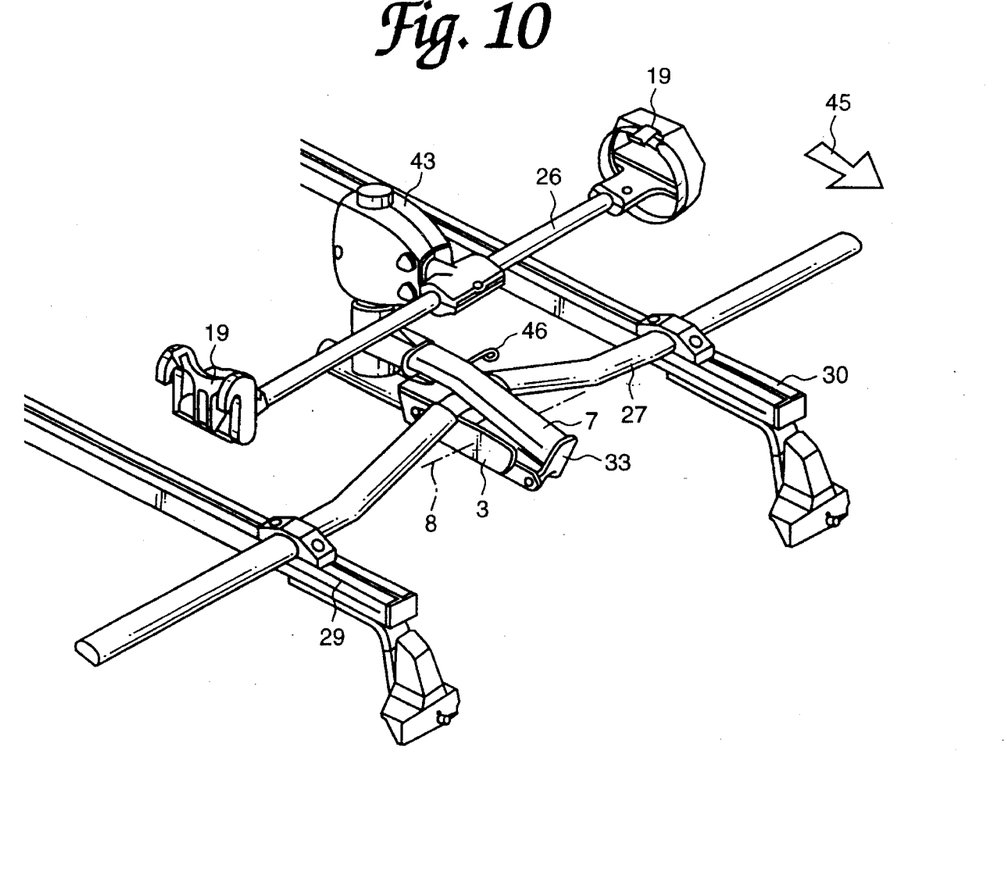
FIG. 10 is a perspective view of an example of an additional embodiment for a lifting device of the invention.

FIG. 10 shows another embodiment example of the lifting device. In this embodiment example, the raised load, the bicycle, for instance, is pivoted about the axis 8 into the raised position. The handlebar post and the seat of the bicycle are fastened with the aid of the gripping elements 19 on the holder rod 26. The holder rod 26 is rigidly fixed in the fastener 43 during pivoting of the load, or the bicycle, upward. In this embodiment example, the extension arm is formed by the pivot arm 7. If the load is a bicycle, it is arranged in reverse position on the load carrier. The pivot arm 7 can be fastened to support 3 with the aid of a stop or fastening device 46.

In order to ease the handling of the lifting device, particularly while fastening the load in the lowered position, it is possible for the lifting device and particularly the carrier bridge 27 to be movably seated at both ends (arrow 45) on the two crossbars 29,30.

Figure 11:
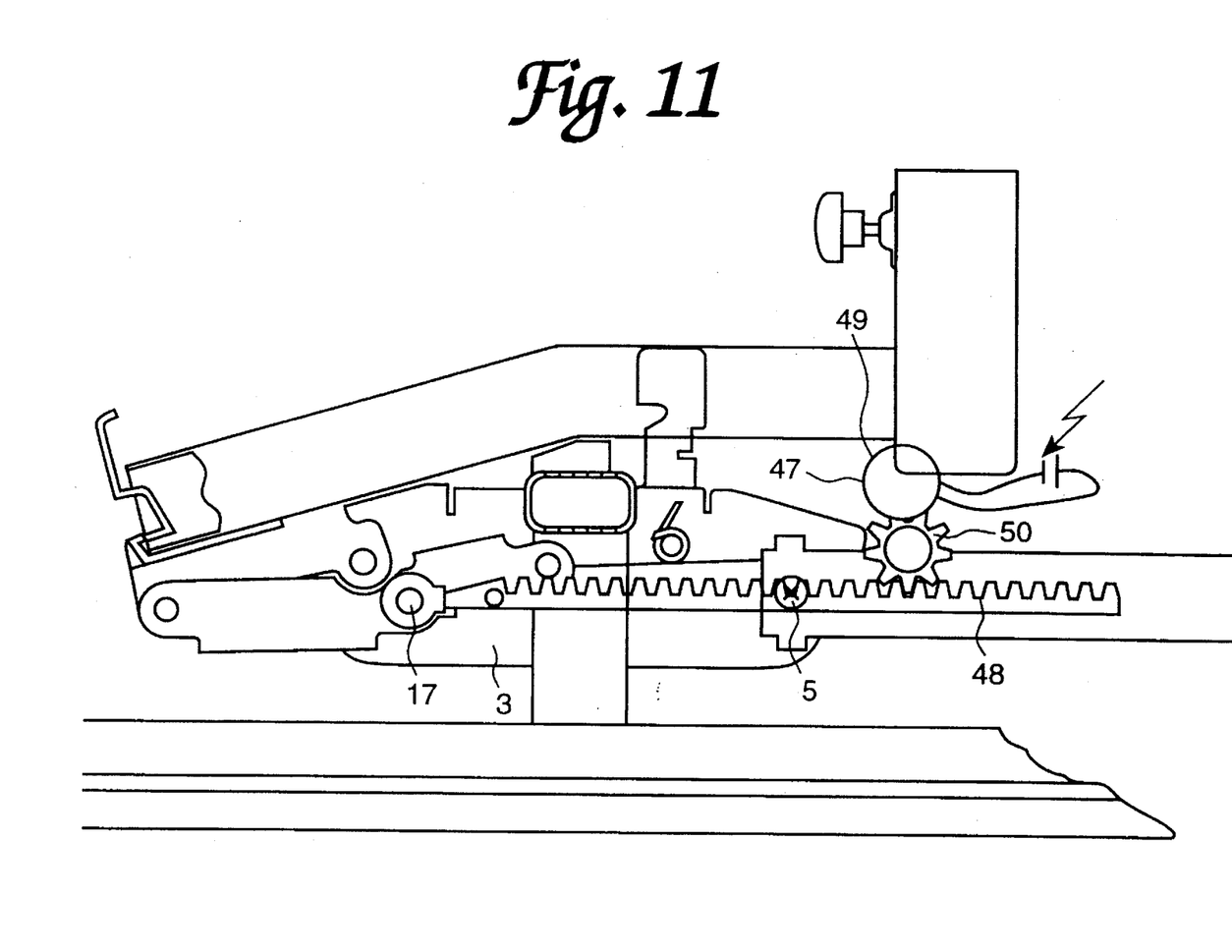
FIG. 11 is a schematic elevational view of an example of an additional embodiment for an energy accumulator.

An additional embodiment example of an energy accumulator is illustrated in FIG. 11. In this embodiment example, the force accumulator consists of an electrical drive, specifically, a DC motor, which can be connected to the battery of a motor vehicle by means of a cable. The torque of the electric motor 47 is transmitted to the attack point 17 by a rack 48 that is propelled by the motor shaft 49 via a pinion 50. The electric motor 47 and a rack housing are seated so as to pivot on the shared support 3 via the pivot point 5, as was also the case with the preceding embodiment examples. The electric drive illustrated in FIG. 11 can be controlled for the production of a correct functional torque with the aid of a forced control.

What is claimed is:

1. A device for lifting and lowering a load onto or from, respectively, a load carrier, comprising:
    an extension arm that is pivoted onto the load carrier; and
    attachment means provided on the extension arm for a load;
    wherein the extension arm makes contact in a lowered position with a stop connected to the load carrier, the extension arm being pivotable about an axis attached to the load carrier into a raised position, in which the extension arm can be stably fastened for positioning the raised load on the load carrier;
    wherein the extension arm is connected via a transmission to an energy accumulator for transferring energy of the energy accumulator onto the load;
    wherein the energy accumulator and the transmission are seated on a shared support and a force orientation with which the energy accumulator acts on the transmission can be changed; and
    wherein the force orientations of the energy accumulator lie on both sides of a dead center position of the transmission, where on one side of the dead center position the accumulator energy is absorbed by a stop on the shared support, and on another side of the dead center position the accumulator energy drives the transmission in a lifting direction.

2. A device according to claim 1, comprising means for rigidly attaching the load to the extension arm.

3. A device according to claim 1, comprising means for articulating the load onto the extension arm.

4. A device according to claim 1, wherein a rest point is defined by the stop, in which the transmission is held free of the load on the load carrier.

5. A device according to claim 1, wherein a drive force of the energy accumulator can be transferred via a force attack point onto a rocker seated on the shared support, and the pivotable extension arm taking up the load can be coupled to the rocker.

6. A device according to claim 5, wherein the attack point can be brought into positions on either side of the rocker by pivoting.

7. A device according to claim 1, wherein a two-wheeled vehicle holder can be attached to the extension arm.

* * * * *